US006217474B1

(12) United States Patent
Ross et al.

(10) Patent No.: US 6,217,474 B1
(45) Date of Patent: Apr. 17, 2001

(54) MULTI SPEED POWER TRANSMISSION

(75) Inventors: Christopher Brian Ross, Chelsea; Michael Colby Sefcik, Linden, both of MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/425,775

(22) Filed: Oct. 22, 1999

(51) Int. Cl.[7] ........................ F16H 3/44

(52) U.S. Cl. ........................ 475/269; 475/275; 475/280

(58) Field of Search ........................ 475/269, 276, 475/280, 281

(56) References Cited

U.S. PATENT DOCUMENTS

| | | | |
|---|---|---|---|
| 5,049,116 * | 9/1991 | Asada | 475/269 |
| 5,165,308 * | 11/1992 | Asada et al. | 74/866 |
| 6,053,839 * | 4/2000 | Baldwin et al. | 475/281 |
| 6,071,208 * | 6/2000 | Koivunen | 475/275 |

* cited by examiner

*Primary Examiner*—Charles A. Marmor
*Assistant Examiner*—Tisha D. Waddell
(74) *Attorney, Agent, or Firm*—Laura C. Hargitt

(57) ABSTRACT

A powertrain has a multi speed power transmission including a planetary gear arrangement with three simple planetary gear sets and six selectively engageable, fluid operated, friction torque transmitting mechanisms. A one-way torque transmitting mechanism is disposed in parallel drive relation with one of the friction torque transmitting mechanisms. The selective engagement of the friction torque transmitting mechanisms will establish seven forward drive ratios, a neutral condition and a reverse drive ratio. All of the forward ratio interchanges are single transition shifts and all of the single ratio skip shifts are single transition shifts. The seven forward drive ratios include four underdrive ratios, a direct drive ratio, and two overdrive ratios. The planetary gear arrangement can be controlled to establish six forward drive ratios with either one overdrive ratio and four underdrive ratios or two overdrive ratios and three underdrive ratios. A five speed arrangement having four forward underdrive ratios, a forward direct ratio a neutral condition and a reverse drive ratio while permitting the elimination of one of the friction torque transmitting mechanisms.

7 Claims, 1 Drawing Sheet

| STICK DIAGRAM | | | TORQUE TRANSMITTING MECHANISM | | | | | | | |
|---|---|---|---|---|---|---|---|---|---|---|
| GEAR | RATIO | STEP | 36 | 30 | 38 | 32 | 26 | 34 | 28 | |
| REV | -2.888 | | X | G | | | | | | |
| NEU | | | O | | | | | | | |
| 1st | 4.870 | | C | | X | G | | | | |
| 2nd | 2.890 | 1.81 | C | | X | | X | | | |
| 3rd | 1.933 | 1.39 | | | | X | X | | | |
| 4th | 1.435 | 1.35 | | | | | X | X | | |
| 5th | 1.000 | 1.44 | | | | | X | | X | |
| 6th | 0.742 | 1.35 | | | | | | X | X | |
| 7th | 0.644 | 1.15 | | | | X | | | X | |
| OAR | 7.5 | | R1/S1 1.69 | | | 2/2 2.88 | | | 3/3 1.69 | |

MULTI SPEED POWER TRANSMISSION

TECHNICAL FIELD

This invention relates to power transmissions and more particularly to multi speed power transmissions having three simple planetary gear sets.

BACKGROUND OF THE INVENTION

Many of the current automobile manufacturers are using five speed automatic transmissions that incorporate three planetary gear sets. There has also been a number of recently issued patents issued that describe five speed automatic transmissions having three planetary gear sets; and some describing five speed automatic transmissions having two planetary gear sets that include a continuous drive connection and a selective drive connection between the planetary gear sets. Most of the two planetary gear set transmissions incorporate a simple planetary gear set and a compound planetary gear set. The transmissions having three simple planetary gear sets have at least one continuous drive connection uniting a member of each planetary gear set; or a clutch mechanism that will unite the three gear sets. These multi speed power transmissions include at least one selectively engageable torque transmitting mechanism for each of the forward speeds. In other words, a five speed transmission has five selectively engageable torque transmitting mechanisms. Generally, the torque transmitting mechanisms include three clutches and two brakes A transmission described in U.S. Pat. No. 4,070,927, issued to Polak on Jan. 31, 1978, has three simple planetary gear sets controlled by five torque transmitting mechanisms to produce six forward speed ratios and a reverse ratio. This transmission produces three underdrive ratios, a direct drive ratio and two overdrive ratios in the forward direction. To provide a seventh speed, Polak incorporates an additional planetary gear set.

SUMMARY OF THE INVENTION

It is an object of the present invention to provide an improved multi speed power transmission having three simple planetary gear sets.

In one aspect of the invention, the three simple planetary gear sets are controlled by a plurality of selectively engageable torque transmitting mechanisms to provide seven forward speed ratios, a reverse ratio, and a neutral condition. In another aspect of the present invention, the seven forward speed ratios, with coast braking, and the reverse ratio are established through the judicious engagement of six torque transmitting mechanisms.

In yet another aspect of the present invention, a one-way torque transmitting device provides the reaction grounding mechanism for the first and second forward ratios when coast braking is not desired. In still another aspect of the present invention, two of the planetary gear sets each have a member connected for continuous rotation with an output shaft and each have another member connected for common rotation.

In yet still another aspect of the present invention, each of the planetary gear sets has at least one member connectable with an input shaft through a selectively engageable clutch mechanism. In a further aspect of the present invention, the third of the planetary gear sets has a member connected for common rotation with a member of one of the other two planetary gear sets and with a selectively engageable friction brake. In yet a further aspect of the present invention, the three planetary gear sets are controlled by the selectively engageable torque transmitting mechanisms to produce four underdrive ratios, a direct drive ratio and two overdrive ratios.

In still a further aspect of the present invention, the three planetary gear sets can be controlled to provide a six speed transmission having four underdrive ratios and one overdrive ratio, a six speed transmission having three underdrive ratios and two overdrive ratios, and a five speed transmission having four underdrive ratios and a direct drive ratios with only two selectively friction engageable clutches and three selectively engageable friction brakes. In a yet still further aspect of the present invention, one of the planetary gear sets has one member continuously drive connected with the input shaft as well as one member selectively connectable with the input shaft through a friction clutch.

DESCRIPTION OF AN EXEMPLARY EMBODIMENT

Figures 1, 2:
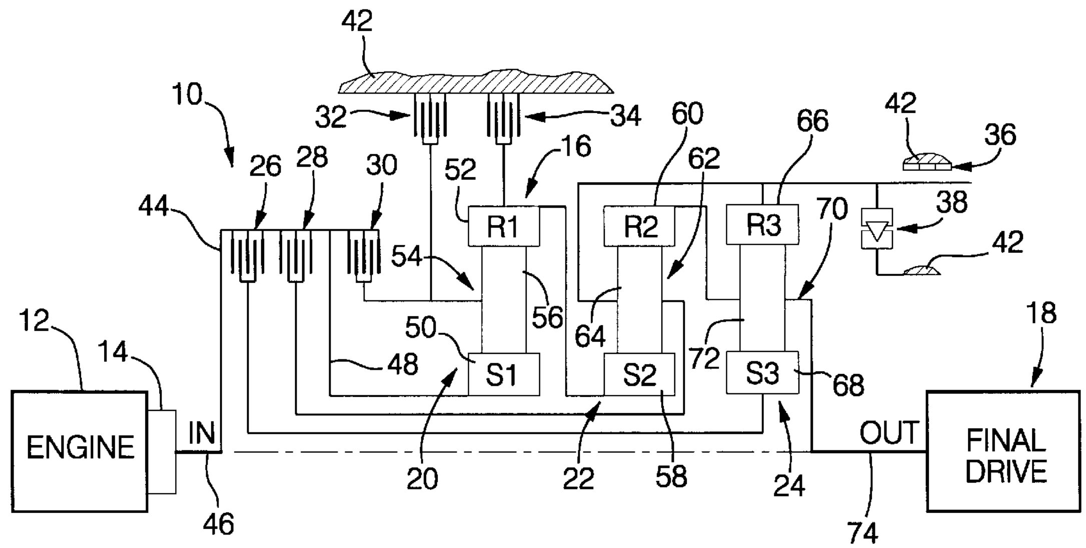
FIG. 1 is a schematic representation of a powertrain having a planetary gear arrangement incorporating the present invention.
FIG. 2 is a truth table describing the operating condition of the various selectively engageable torque transmitting mechanisms of the planetary gear arrangement of FIG. 1 wherein "X" represents an engaged condition, "C" represents an engaged condition for coast braking, "O" represents an optional engaged/disengaged condition and "G" represents an engagement at vehicle launch.

A powertrain 10, shown in FIG. 1, has an engine 12, a torque converter 14, a multi speed transmission 16 and a final drive 18. The engine 12 is a conventional prime mover such as an internal combustion engine. The torque converter is a conventional hydrodynamic device and the final drive is a conventional reduction and differential gear mechanism The transmission 16 has a planetary gear arrangement including three simple planetary gear sets 20, 22 and 24; three conventional selectively engageable, fluid operated, rotating torque transmitting mechanisms 26, 28 and 30; three conventional selectively engageable, fluid operated, stationary torque transmitting mechanisms 32, 34, and 36 and a one-way torque transmitting mechanism 38. The one-way torque transmitting mechanism 38 and the torque transmitting mechanism 36 are disposed in parallel torque transmitting paths to a transmission housing 42.

The torque transmitting mechanisms 26, 28 and 30 are drivingly connected with an input housing 44 that is drivingly connected with the torque converter 14 through an input shaft 46. The housing 44 is connected via a hub 48 with a sun gear member 50 that is a component of the planetary gear set 20. The planetary gear set 20 also includes a ring gear member 52 and a carrier assembly member 54. The carrier assembly member 54 has a plurality of rotatably mounted pinion gear members 56 that mesh with both the sun gear member 50 and the ring gear member 52. The carrier assembly member 54 is selectively connectable with the input housing 44 through the torque transmitting mechanism 30 and with the transmission housing 42 through the torque transmitting mechanism 32. The ring gear member 52 is selectively connectable with the housing 42 through the torque transmitting mechanism 34 and continuously connected with a sun gear member 58 which is a member of the planetary gear set 22.

The planetary gear set 22 also includes a ring gear member 60 and a carrier assembly member 62 that has a plurality of rotatably mounted pinion gear members 64 disposed in meshing relation with both the sun gear member 58 and the ring gear member 60. The carrier assembly member 62 is selectively connectable with the input housing 44 through the torque transmitting mechanism 28 and is also selectively connectable with the transmission housing 42 through the torque transmitting mechanism 36 and the one-way torque transmitting mechanism 38. The carrier assembly member 62 is continuously drive connected with a ring gear member 66 that is a component of the planetary gear set 24.

The planetary gear set 24 also includes a sun gear member 68 and a carrier assembly member 70 which has a plurality of rotatably mounted pinion gear members 72 disposed in meshing relation with the sun gear member 68 and the ring gear member 66. The sun gear member 68 is selectively connectable with the input housing 44 through the torque transmitting mechanism 26. The carrier assembly member 70 and the ring member 60 of the planetary gear set 22 are continuously drivingly connected with an output shaft 74 that is drivingly connected with the final drive mechanism 18.

The planetary gear arrangement 16 will provide a reverse drive ratio, a neutral condition and seven forward drive ratios between the input shaft 46 and the output shaft 74 when the torque transmitting mechanisms 26, 28, 20, 32, 34, and 36 are selectively engaged in accordance with the scheme set forth in the truth table shown in FIG. 2. The engagement and disengagement of the torque transmitting mechanisms 26, 28, 20, 32, 34, and 36 is preferably controlled by a conventional electronic control unit (ECU), not shown, that includes a preprogrammed digital computer in a well-known manner.

To establish the reverse drive ratio in the planetary gear arrangement 16, the torque transmitting mechanisms 36 and 30 are engaged. As indicated in FIG. 2, the torque transmitting mechanism 30 is engaged to initiate vehicle launch in reverse. To accomplish this the engagement of torque transmitting mechanism 30 occurs at a rate controlled by the ECU in a well-known manner. With the engagement of the torque transmitting mechanism 36, the carrier assembly member 62 is stationary and the sun gear member 58 is driven forwardly, engine rotation direction, such that the ring gear member 60 and output shaft 74 rotate in reverse.

The neutral condition of the planetary gear arrangement 16 is established when all of the torque transmitting mechanisms are disengaged. However, the torque transmitting mechanism 36 can be active without a drive ratio being established. This will permit a shift from reverse to first forward or from neutral to either reverse or first forward with only the garage shift element being controlled.

To establish the first forward ratio, the torque transmitting mechanism 32 is engaged at a controlled rate. Either the torque transmitting mechanism 36 or the one-way torque transmitting mechanism 38 will establish the carrier assembly member 62 as a reaction member. The controlled engagement of the torque transmitting mechanism 32 will establish the carrier assembly member 54 as a reaction member. The sun gear member 50 will provide an input member for the planetary gear arrangement 16. The planetary gear sets 20 and 22 provide the reduction ration for the first forward drive ratio.

To establish the second forward drive ratio, the torque transmitting mechanisms 32 and 26 are interchanged under the control of the ECU while the torque transmitting mechanism 38 remains engaged. The sun gear member 68 becomes the input member and the ring gear member 66 becomes the reaction member. The ring gear member 66 is restrained from rotation by the torque transmitting mechanism 36, if engaged, or the one-way torque transmitting mechanism 38. This is a single transition shift in that only one torque transmitting mechanism needs to be released and only one torque transmitting mechanism need to be engaged. The release and engagement of the torque transmitting mechanisms is controlled by the ECU in a well-known manner. The second ratio is provided through the planetary gear set 24.

To establish the third forward ratio, the one-way torque transmitting mechanism 38 and the torque transmitting mechanism 32 are interchanged, as controlled by the ECU, while the torque transmitting mechanism 26 remains engaged. This is a single transition shift. The one-way torque transmitting mechanism 38 will automatically release when the ring gear member 66 rotates forwardly. The third forward ratio is an underdrive ratio established by all three planetary gear sets 20, 22 and 24.

The fourth forward drive ratio is established by the interchange of the torque transmitting mechanisms 32 and 34, as controlled by the ECU, while the torque transmitting mechanism 26 remains engaged. This is a single transition shift. The engagement of the torque transmitting mechanism 34 will establish the sun gear member 58 as a reaction member in the planetary gear arrangement 16. The sun gear member 68 remains the input member. The fourth forward ratio is an underdrive ratio established by the planetary gear sets 22 and 24.

The fifth forward drive ratio is established by the interchange of the torque transmitting mechanisms 34 and 28, as controlled by the ECU, while the torque transmitting mechanism 26 remains engaged. This is a single transition shift. In the fifth forward drive ratio two input torque transmitting mechanisms are engaged which will result in the planetary gear arrangement rotating as a single unit to provide a direct drive. It should be noted that both the ring gear member 66 and the sun gear member 68 are rotated at the speed of the input shaft 46 such that the carrier assembly member 70 and the output shaft 74 will also rotate at the speed of the input shaft 46.

The sixth forward drive ratio is established by the interchange of the torque transmitting mechanisms 26 and 34 under the control of the ECU while torque transmitting mechanism 28 remains engaged. This is a single transition shift. The torque transmitting mechanism 34 establishes the sun gear member 58 as the reaction member in the planetary gear arrangement 16 and the torque transmitting mechanism 28 establishes the input member in the planetary gear arrangement 16. This presents an overdrive ratio between the input shaft 46 and the output shaft 74 through the planetary gear set 22.

The seventh forward drive ratio is established by the interchange of the torque transmitting mechanisms 34 and 32 under the control of the ECU while the torque transmitting mechanism 28 remains engaged. The carrier assembly member 62 and the sun gear member 50 are the input members for the planetary gear arrangement 16 and carrier assembly member 54 becomes the reaction member for the planetary gear arrangement 16. The planetary gear sets 20 and 22 establish the seventh forward ratio, which is an overdrive ratio between the input shaft 46 and the output shaft 74.

While the sun gear member 50 is continually driven by the input shaft 46, the planetary gear set 20 only contributes to the drive ratio when the torque transmitting mechanism 32 is engaged. This occurs in the first, third, and seventh forward ratios.

The truth table depicted in FIG. 2 presents a typical set of drive ratios that are available with the present invention. The "OAR" term in the truth table is the overall ratio between the first forward ratio and the seventh forward ratio. The step column represents the step size between adjacent ratios, for example, the step size between the first and second forward ratios is 1.81. The Ri/Si represents the ratio of the number of teeth on the ring gear 52 to the number of teeth on the sun gear 50. The R2/S2 and R3/S3 represent corresponding values for the respective gears in the planetary gear sets 22 and 24.

The truth table in FIG. 2 also makes it apparent that the single ratio skip shifts (i.e. first to third, second to fourth etc.) are single transition shifts. Only one torque transmitting mechanism is disengaged while only one torque transmitting mechanism is engaged. During a fourth to sixth ratio interchange, the torque transmitting device 26 is disengaged while the torque transmitting device 28 is engaged. Those skilled in the art will recognize the other single transition skip shifts. The overall ratio of 7.5 and acceptable ratio step provide an excellent transmission for truck applications. The large first gear ratio (4.870) provides very good towing capacity and enables the torque converter to be downsized. The large first gear ratio and the close (small step) ratios will allow for engine down sizing in some applications. The second forward drive ratio is sufficiently high to permit second gear launch when the vehicle is not heavily loaded. During a second ratio start, the torque transmitting mechanism 26 would be engaged to control vehicle launch.

Two six speed transmission are available with the present invention. One of the six speed transmissions drops the seventh ratio to provide four underdrives, a direct drive and one overdrive. The reverse drive is unchanged. The low or first gear ratio remains a 4.870 to provide good launch characteristics and towing for both a truck or automobile transmission. The sixth gear ratio become 0.742 and the OAR is 6.6.

The other six speed drops the low gear ratio and changes the R1/S1 and R3/S3 ratios to 1.96 by changing the number of teeth on the sun gears 50 and 68 from 58 teeth to 50 teeth. This establishes the first gear ratio at 2.96 and the sixth gear ratio at 0.656 with the OAR at 4.5. This will provide a transmission that is suited for applications in rear wheel drive automobiles. The step ratios are close to establish very good acceleration performance and ratio interchange smoothness. Those skilled in the art will recognize that the low gear ratio of this proposal is determined by the planetary gear set 24 and the second and sixth forward ratios are partly established by the planetary gear set 20. The ratio interchange pattern will be the same as that shown in FIG. 2 for the second through seventh ratios.

One other variation is possible with the present invention; and that is a power transmission with five forward ratios, a neutral condition and one reverse ratio. This transmission presents four underdrive ratios and a direct drive ratio in the forward direction. Other commonly used five speed transmissions have at least one overdrive ratio and most have two overdrive ratios. The torque transmitting mechanism 28 is eliminated when a five speed transmission is desired. This will shorten the overall length of the transmission for improved packaging and space utilization, particularly in front wheel drive applications. The five speed transmission would preferably use the ratios set forth for first through fifth in FIG. 2. An OAR of 4.9 is available with these values and the launch ratio of 4.87 is retained.

With the elimination of the torque transmitting mechanism 28, the fifth ratio is established with the engagement of the torque transmitting mechanisms 26 and 30. Thus the torque transmitting mechanism 30 is employed in both the reverse ratio and the fifth forward ratio. The interchange between fourth and fifth is accomplished through the interchange of the torque transmitting mechanisms 34 and 30. This is a single transition shift and the skip shifts remain single transition shifts. The large launch ratio (4.87) permits downsizing of the torque converter and the direct drive (one to one) fifth ratio allows the use of low transfer gear ratios in the final drive 18 which provides efficient top gear fuel economy.

Those skilled in the art will recognize that the rotating torque transmitting mechanisms 26, 28 and 30 are commonly designated as clutches and the stationary torque transmitting mechanisms 32, 34 and 36 are commonly termed brakes or stationary clutches.

What is claimed is:

1. A multi speed transmission comprising:

an input shaft;

an output shaft;

a first simple planetary transmission having a sun gear member, a ring gear member and a carrier assembly member including a plurality of rotatably mounted pinion gear members disposed in meshing relation with both the sun gear member and the ring gear member, said sun gear member being continually drivingly connected with said input shaft;

a second simple planetary transmission having a sun gear member, a ring gear member and a carrier assembly member including a plurality of rotatably mounted pinion gear members disposed in meshing relation with both the sun gear member and the ring gear member, said sun gear member being continually drivingly connected with said ring gear member of said first simple planetary gear set;

a third simple planetary transmission having a sun gear member, a ring gear member and a carrier assembly member including a plurality of rotatably mounted pinion gear members disposed in meshing relation with both the sun gear member and the ring gear member, said carrier assembly member being continually drivingly connected with both said output shaft and said ring gear member of said second simple planetary gear set, said ring gear member being continually drivingly connected with said carrier assembly member of said second simple planetary gear set;

a first selectively engageable torque transmitting mechanism selectively connectable between said input shaft and said carrier assembly member of said first simple planetary gear set;

a second selectively engageable torque transmitting mechanism selectively connectable between said input shaft and said sun gear member of said third simple planetary gear set;

a third selectively engageable torque transmitting mechanism selectively connectable between a transmission housing and said carrier assembly member of said first simple planetary gear set;

a fourth selectively engageable torque transmitting mechanism selectively connectable between a transmission housing and said ring gear member of said first simple planetary gear set and said sun gear member of said second simple planetary gear set; and a fifth selectively engageable torque transmitting mechanism selectively connectable between a transmission housing and said carrier assembly member of said second simple planetary gear set and said ring gear member of said third simple planetary gear set.

2. The multi speed transmission defined in claim 1 further comprising:

a sixth torque transmitting mechanism selectively connectable between said input shaft and said carrier assembly member of said second simple planetary gear set and said ring gear member of said third simple planetary gear set; and a one-way torque transmitting mechanism disposed between said transmission housing and said carrier assembly member of said second simple planetary gear set and said ring gear member of said third simple planetary gear set in parallel torque transmitting relation with said fifth torque transmitting mechanism.

3. A multi speed power transmission comprising:

an input shaft;

an output shaft;

a planetary gear arrangement disposed between said input shaft and-said output shaft including a first simple planetary gear set, a second simple planetary gear set and a third simple planetary gear set with a first member of said first simple planetary gear set being continually connected with a first member of said second simple planetary gear set, a second member of said first simple planetary gear set being continually connected with said input shaft, a second member of said second simple planetary gear set being continually connected with a first member of said third simple planetary gear set, a third member of said second simple planetary gear set being continually connected with a second member of said third simple planetary gear set and with said output shaft;

a first rotating torque transmitting mechanism selectively connectable between said input shaft and a third member of said first simple planetary gear set;

a second rotating torque transmitting mechanism selectively connectable between said input shaft and a third member of said third simple plant gear set;

first stationary torque transmitting mechanism selectively connectable between a transmission housing and said third member of said first simple planetary gear set;

a second stationary torque transmitting mechanism selectively connectable between said transmission housing and both of said first member of said first simple planetary gear set and said first member of said second simple plantary gear set;

a third stationary torque transmitting mechanism selectively connectable between said transmission housing and both of said second members of said second simple planetary gear set and said first member of said third simple planetary gear set;

a third rotating torque transmitting mechanism selectively connectable between said input shaft and both of said second member of said second simple planetary gear set and said first member of said third simple planetary gear set; and said torque transmitting mechanisms being selectively engageable in combinations of two to establish seven forward drive ratios and one reverse ratio between said input shaft and said output shaft.

4. The multi speed power transmission defined in claim 3 further comprising:

said first simple planetary gear set and said second simple planetary gear set being effective in combination to establish a first of said forward drive ratios with the engagement of said first stationary torque transmitting mechanism and said third stationary torque transmitting mechanism;

said third simple planetary gear set being effective to establish a second of said forward drive ratios with the engagement of said third stationary torque transmitting mechanism and said second rotating torque transmitting mechanism, said second forward ratio being one step above said first forward ratio;

said first simple planetary gear set, said second simple planetary gear set and said third simple planetary gear set being effective in combination to establish a third forward drive ratio with the engagement of said first stationary torque transmitting mechanism and said second rotating torque transmitting mechanism, said third forward drive ratio being two steps above said first forward drive ratio;

said second simple planetary gear set and said third simple planetary gear set being effective in combination to establish a fourth of said forward drive ratios with the engagement of said second rotating torque transmitting mechanism and said second stationary torque transmitting mechanism, said fourth forward drive ratio being three steps above said first forward drive ratio;

said second simple planetary gear set being effective to establish a sixth of said forward drive ratios with the engagement of said third rotating torque transmitting mechanism and said second stationary torque transmitting mechanism, said sixth forward drive ratio being five steps above said first forward drive ratio; and said first simple planetary gear set and said second simple planetary gear set being effective in combination to establish a seventh of said forward drive ratios with the engagement of said third rotating torque transmitting mechanism and said first stationary torque transmitting mechanism, said seventh forward drive ratio being six steps above said first drive ratio.

5. The multi speed power transmission defined in claim 3 further comprising:

a first and lowest and a seventh and highest of the forward speed ratios being established through the planetary action of the first simple planetary gear set and the second planetary gear set.

6. The multi speed power transmission defined in claim 3 further comprising:

a first, second, third, and fourth of said forward speed ratios being underdrive ratios;

a fifth of said forward speed ratios being a direct drive ratio; and a sixth and seventh of said forward speed ratios being overdrive ratios.

7. The multi speed power transmission defined in claim 3 further comprising:

said third planetary gear set being maintained in a direct drive condition by the engagement of said second and third rotating torque transmitting mechanisms.

* * * * *